United States Patent [19]

Garbe

[11] 4,264,947
[45] Apr. 28, 1981

[54] REFLECTOR ARRANGEMENT FOR PROVIDING HIGH INTENSITY, UNIFORM AND SPECULAR ILLUMINATION OF A RELATIVELY LARGE EXPOSURE AREA

[75] Inventor: William F. Garbe, Rochester, N.Y.

[73] Assignee: Eastman Kodak Company, Rochester, N.Y.

[21] Appl. No.: 914,105

[22] Filed: Jun. 9, 1978

[51] Int. Cl.³ .............................................. H01G 5/10
[52] U.S. Cl. .................................... 362/297; 362/301; 362/308
[58] Field of Search ............... 362/307, 308, 301, 298, 362/297; 352/198, 203; 355/55

[56] References Cited

U.S. PATENT DOCUMENTS

| 1,415,595 | 5/1922 | McGrath | 362/297 |
| 1,880,414 | 10/1932 | Capstaff | 362/307 |
| 3,291,976 | 12/1966 | Rosenblatt . | |
| 3,318,184 | 5/1967 | Jackson | 352/198 |
| 3,457,400 | 7/1969 | Appeldorn | 362/307 |
| 3,457,401 | 7/1969 | Hoekstra | 362/298 |
| 3,676,667 | 7/1972 | Malifaud | 362/301 |
| 3,693,515 | 9/1972 | Baker | 352/203 |
| 3,701,898 | 10/1972 | McNamara . | |
| 3,995,153 | 11/1976 | Malifaud | 362/297 |

FOREIGN PATENT DOCUMENTS 27261 of 1896 United Kingdom ..................... 362/301

Primary Examiner—Monroe H. Hayes
Attorney, Agent, or Firm—Donald W. Strickland

[57] ABSTRACT

To provide high intensity, uniform and specular illumination over a relatively large area, the present invention provides a specially configured reflector and a radiation source so positioned within the reflector that an apparent source is produced comprising the true source plus a spherical array of virtual images of the source.

7 Claims, 9 Drawing Figures

REFLECTOR ARRANGEMENT FOR PROVIDING HIGH INTENSITY, UNIFORM AND SPECULAR ILLUMINATION OF A RELATIVELY LARGE EXPOSURE AREA

BACKGROUND OF THE INVENTION

1. Field of the Invention

The present invention relates to a reflector arrangement for use with a radiation source to provide high intensity, uniform and specular illumination of an exposure plane. The term "specular" as used herein means "collimated" or "substantially collimated", i.e. comprised of radiation in which the rays have a small angle of divergence.

2. Description Relative to the Prior Art

The present invention is concerned with the difficult problem of uniformly illuminating a relatively large area exposure plane with high intensity, specular radiation. More specifically, the present invention relates to a reflector arrangement which, when used with a radiation source positioned as taught by the present invention, provides illumination of a type that is useful in the photographic replication of a video record device, such as a video disc, by means of optical contact printing. In order to appreciate the problems involved in providing such illumination, it is useful to examine the photographic replication of video discs in more detail.

In theory, replicate video discs can be mass produced from a master video disc by (1) placing the master and replicate discs in intimate contact and (2) exposing the replicate disc through the master disc with actinic radiation. In actual practice, however, this seemingly simple contact printing process has not yet found widespread application among prospective video disc manufacturers. Instead, a more complex replication process involving sophisticated embossing techniques is generally used wherein a master die (which contains the video information in the form of billions of micron sized bumps) is prepared and pressed into contact with deformable plastic material which becomes the replicate disc. There appear to be at least three reasons why the simpler contact printing process is not used:

(1) There is a problem in finding a photographic replicate medium in which billions of closely spaced micron sized data bits can be photographically recorded.

(2) Even if such a photographic replicate medium were available, it is difficult to maintain intimate contact, between master and replicate, over the relatively large area involved (the standard video disc is 30 cm in diameter).

(3) Lastly, it is difficult to illuminate such a large area with radiation of sufficient intensity, uniformity and specularity to make the contact printing operation successful.

U.S. patent application Ser. No. 715,017 filed Aug. 16, 1977 of common assignee concerns the first two problems. (U.S. application Ser. No. 715,017 was refiled as Continuation Application Ser. No. 891,865 on March 30, 1978, now abandoned.) Briefly, that application discloses a photographic replicate medium having certain properties which enable the billions of closely packed, micron sized data bits to be recorded with excellent quality, even if intimate contact is not achieved between the master and replicate devices during the contact printing process. The third problem, i.e., providing proper illumination of the master disc during contact printing, remains, however, and has posed serious obstacles to a commercially acceptable contact printing replication process for video discs. This problem is further complicated by the fact that at least one of the materials disclosed in U.S. Ser. No. 715,017 has been found to release nitrogen gas upon exposure to actinic radiation. The nitrogen gas is released in such quantities that if one attempts to replicate in such materials by optical contact printing, the master and replicate devices are forced apart during the exposure. It may be that if the exposure duration can be made sufficiently short, the exposure can take place before the nitrogen gas forces the sandwiched master and replicate devices out of contact. All other factors constant, decreasing the exposure time means that the intensity of the exposing sources must be increased. It has been found, however, that—due to the relatively slow photographic speed of the replicating material—even a high intensity xenon flashlamp is not sufficient, by itself, to provide illumination of sufficient intensity to make such short exposure times feasible.

It is known to use certain types of reflectors as a means of altering the intensity distribution of a radiation source (such as a xenon flashlamp). For example, one such reflector theoretically produces parallel rays of light from a light source located at the focal point of a parabolic reflector. In actual practice, the light source is of finite extent so most parts of the source are not precisely located at the focal point, and divergence of rays from a common optical axis is produced. Further, light emitted from the source in a direction away from the parabolic reflector (and away from the target area) is lost. This unused radiation can amount to a substantial, even major, portion of the total light energy.

Another form of reflector is an elliptical reflector with a light source positioned at the near focal point. The elliptical reflector focuses the light from the source into the far focal point of the "ellipse". The finite extent of the source prevents perfect focusing, the result being that the light rays are concentrated in a small but finite area about the far focal point. Elliptical reflectors are, therefore, generally used to provide high intensity illumination of small areas. This type of reflector is inherently unsuitable for optical contact printing of video discs because of the relatively large disc areas which must be illuminated.

Both of the above types of reflectors, and all other reflectors having a curved reflective surface, use optical power to accomplish focusing of light rays emitted from a source. The optical power is provided in the curved reflective surfaces. The illumination pattern of such a reflector is very sensitive to the uniformity and positioning of the source, as well as to the precise shape of its curved surface. The result is an effect, sometimes referred to as "zoning", wherein shadows, hot spots, or other types of uneven illumination occur in the exposure plane. With preferred video disc replication materials, non-uniformities of illumination can cause loss of video information or a reduction in the signal-to-noise ratio. Thus, the above discussed zoning problems make curved-surface reflectors generally unattractive for use in replicating video discs by optical contact printing.

In an effort to avoid these problems, it has been suggested that a multi-faceted reflector could be used which contains no curved surfaces. (Proceedings of the Microelectronics Seminar, San Diego, Calif., 1974, Oct. 21-22, *Lenses And Optical Systems Used In Microelec-*

*tronics* by Robert E. Hopkins, Tropel, Inc., p. 37). As taught in that paper, a light source is positioned inside a pyramidal reflector to provide a light source for a projector. The source is positioned within the reflector such that the reflective facets produce an apparent source comprised of an annular array of virtual images of the true light source. As stated in the paper, "[t]he ring of light has to be treated carefully for it is exactly the shape of image that the optical system doesn't want as far as resolution is concerned ... [I]t would be necessary to introduce some scattering to throw light into the center of the aperture to avoid the doughnut-shaped image of light that it forms." While these comments are directed to the use of such a reflector in a projection optical system, they apply as well to optical contact printing, i.e., use of the pyramidal reflector as taught in the above paper would still produce a doughnut-shaped angular distribution of illuminance, and the annular array of source images would decrease the specularity of illumination, thereby lowering the resolution of the contact printing process.

Thus, while some type of reflector appears necessary to provide high intensity, uniform and specular illumination for the contact printing replication of video discs, both curved surface reflectors and multi-faceted reflectors, such as the pyramidal reflector described above, are unsuitable because of inherent non-uniformities in illumination and/or decreases in the specular quality of illumination.

SUMMARY OF THE INVENTION

In order to obtain high intensity, uniform and specular illumination of an exposure plane, the present invention provides a reflector comprising at least three planar reflective elements disposed in a pyramidal configuration to form a pyramidal reflector. In contrast to the prior art teaching of a pyramidal reflector that forms, in essence, an annular array of virtual images of a true source (which inherently means the reflector produces non-specular and non-uniform radiation), the present invention provides a reflector which is so formed that when a radiation source is suitably positioned within the pyramidal reflector, the reflector produces an apparent source comprised of the true source plus a spherical array of virtual images of the true source, the apparent source being of such a size that it provides high intensity, uniform and specular illumination of a relatively large area exposure plane defined by the base of the pyramidal reflector.

BRIEF DESCRIPTION OF THE DRAWINGS

In the detailed description of the preferred embodiments of the invention presented below, reference is made to the accompanying drawings, in which:

FIGS. 2a and 2b are diagrams useful in describing the optical characteristics of the reflector-light source arrangement shown in FIG. 1a;

DETAILED DESCRIPTION OF THE INVENTION

To replicate video discs by optical contact printing, a source of radiation is preferred which (1) is of high intensity, (2) uniformly illuminates an exposure plane, and (3) is specular. The radiation source is preferably of high intensity so that the exposure time can be made short, thereby speeding up production. Further, at least one known photographic replicate medium used in the contact printing replication of video discs releases a gas during exposure which causes the master and replicate discs to separate. One possible approach to this loss-of-contact problem would be to use a light source of such high intensity that the exposure is completed before enough gas is released to separate the master and replicate discs. In addition to being of high intensity, the light source should also provide uniform illumination over the exposure plane since many photographic replication materials are highly sensitive to non-uniformities of illumination. Lastly, the light source should preferably have a specular quality because video information is commonly carried in the form of billions of micron sized data bits. As is well known, using a diffuse light source for optical contact printing results in lower resolution. While the light source need not be preferably specular, it is desirable that the degree of specularity be maintained at as high a level as possible to promote high quality replication of the video information.

Figure 1A:
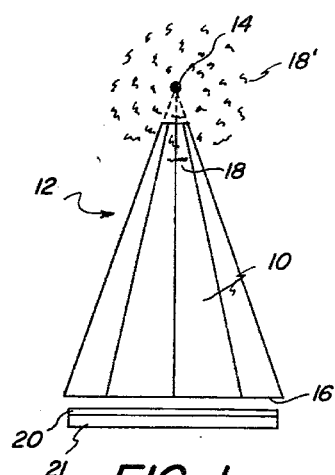
FIGS. 1a and 1b are diagrams useful in illustrating certain aspects of a reflector-light source arrangement in accordance with the present invention.

In accordance with a presently preferred embodiment of the invention, apparatus is shown in FIG. 1a which provides high intensity, uniform and relatively specular illumination of an exposure plane. A pyramidal arrangement of generally planar reflective surfaces 10 forms a pyramidal reflector 12. The reflective surfaces 10 may be formed in various ways. For example, each surface 10 can be formed by a trapezoidally or triangularly shaped piece of aluminum or other reflective material, which pieces are then assembled in the pyramidal configuration shown in FIG. 1a. In general, in the case where the reflector is comprised of individual reflective elements, the reflector comprises at least three of such elements. Each element has a generally planar reflective surface and the elements are disposed to form a pyramidal configuration of inner reflective surfaces. As another example, a solid pyramid can be formed from glass, plastic or other material which has its outer surface coated with a reflective material to form the pyramidal arrangement of reflective surfaces 10.

The pyramidal reflector 12 defines an apex 14 and an open base 16. It should be noted that the reflective surfaces 10 need not extend all of the way to the apex 14 (in which case they would be triangularly shaped) but, rather, may be trapezoidally shaped to form the truncated pyramid shown in FIG. 1a. Such truncation permits a radiation source 18 to be easily placed inside the pyramidal reflector 12. The radiation source 18 is disposed within the pyramidal reflector 12 near the apex 14. Multiple reflections of the source 18 from the reflective surfaces 10 cause the source 18 to appear from an exposure plane defined by the open base 16 as a spherical array of virtual images 18'. The virtual images 18' are positioned on a "phantom spherical surface" which is centered on the apex 14 and has a radius equal to the distance from the apex 14 to the true source 18. The particular position of the source 18 within the reflector 12 may vary depending upon the application. An exposure plane defined by the base 16 of the reflector 12 is thus illuminated by an apparent source comprised of the true source 18 plus a spherical array of virtual images 18' of the true source. A master video disc 20 which lies in such an exposure plane is thus illuminated by this apparent source, rather than by just the true source 18. (The exposure plane "defined" by the open base of the pyramidal reflector need not be proximate the base, but may be either above or below the base region of the reflector.) In any event the illumination is extremely uniform.

Figure 1B:
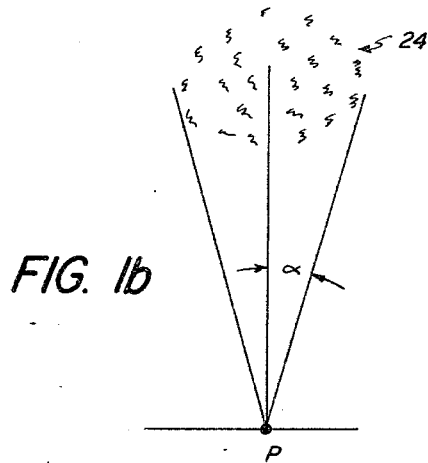

The apparatus described in FIG. 1a also produces illumination which is of high intensity and which is specular: "High intensity" results from the fact that all radiation emitted by the source 18 strikes the surfaces 10 and is reflected down to the exposure plane, except for a relatively small amount which escapes through the truncated top of the pyramidal reflector 12. The efficiency of the pyramidal reflector 12 can be increased by decreasing the amount of truncation and/or by increasing the reflective qualities of the surfaces 10. "Specularity" results from the fact that the pyramidal reflector 12 of the present invention produces an apparent source such that a half-angle $\alpha$, which is one-half the angle subtended by the apparent source 24 as viewed from a point P at the center of the exposure plane (see FIG. 1b), is a relatively small angle. Since the apparent source 24 is spherical in shape, the half-angle subtended by the apparent source 24 as viewed from any other point in the exposure plane will be less than $\alpha$. It is apparent from FIG. 1b that the illumination half-angle $\alpha$ (and thus the degree of specularity) is determined by the diameter of the apparent source 24 and the height of the reflector. For a given reflector, maximum specularity therefore results when the source is placed high in the reflector, i.e., near the apex. Insofar as video disc replication is concerned, it has been found that satisfactory results are obtained when the dimensions of the source 18 and the reflector 12 are so chosen as to provide an illumination half-angle $\alpha$ of about 10°. (The illumination half-angle of the apparent source 24 as viewed from any other point in the exposure plane will thus be less than 10°.) Even with low grade reflecting surfaces, measurements indicate that about 75% of the radiation received by the mid-point of the exposure plane is contained within the 10° half-angle.

Thus, to replicate video information from a master disc 20 to a replicate disc 21 by optical contact printing, the master and replicate discs are superposed and placed in an exposure plane defined by the base 16 of the pyramidal reflector 12; see FIG. 1a. The source 18 is then turned on for a sufficient time to make the contact print exposure.

Figure 2A:
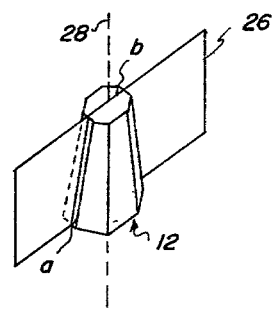
Figure 2B:
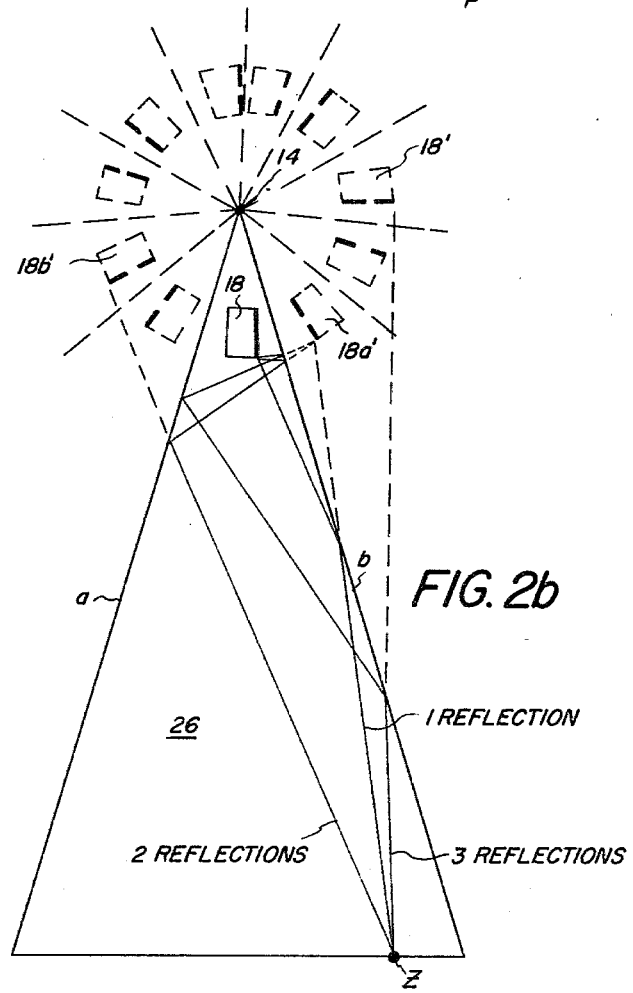

To analyze the optics of the pyramidal reflector, it is convenient (see FIG. 2a) to confine the analysis to a plane 26 through the axis 28 of the reflector 12 and perpendicular to two opposite surfaces a and b (in the case of pyramidal reflector having an even number of sides). Analysis of skew rays (those rays not lying in the above-defined plane), and of odd-sided reflectors, is more involved, but inspection of actual reflectors shows that the same general conclusions hold. FIG. 2b shows an "unfolded" optical diagram (for the plane 26) of an even-sided pyramidal reflector, it being well known that the analysis of mirror and prism systems may be simplified by unfolding the system at the mirror surfaces so that light rays proceed through the unfolded system in straight lines. A true source 18 is positioned near the apex 4 of the pyramidal reflector. The true source 18 is, of course, seen from a viewpoint Z without any reflection from the two surfaces a and b of the reflector. Using the known fact that the angle of incidence equals the angle of reflection, the virtual images of the true source 18 can be found by ray tracing. For example, virtual image 18'a is formed by a first reflection of the true source from face b. Virtual image 18'b is the second reflection of the true source as seen in Face a, and so on. It is thus apparent that the virtual images closest to the real source undergo one reflection, the next closest images undergo two reflections, and so on around the virtual image array. Note that the image of the source 18 is reversed at each reflection. (The true source 18 is shown as a rectangle with a heavy edge to show the reversal on reflection.) Continuing in this manner it is seen that, for the particular plane 26 shown in FIG. 2b, the reflections of the true source 18 form a circular array of virtual images 18'. A complete, even-sided pryamidal reflector has such an array associated with each pair of faces, plus partial arrays at the corners, and intermediate arrays which result from skew reflections between faces. The sum of the arrays is a spherical array comprised of both complete and partial images of the source, the spherical array being centered on the apex of the pyramid. The radius of the spherical array is equal to the distance that the true source is spaced from the pyramid apex. The apparent source (the virtual array plus the true source) is visible from any point at the open base of the pyramidal reflector, although some of the individual images will be cut off, and other new images appear, as the point of view is moved.

As is apparent from the above explanation, the function of the pyramidal reflector is to intercept the light rays emitted from the true source in directions which would not otherwise be useful, and to redirect them so that they pass through the base and contribute to the illumination of the exposure plane. Each of the virtual images which makes up the spherical array is a view of the true source formed by rays emitted in some direction away from the exposure plane and redirected, by one or more reflections, through the base of the pyramid. The same general results are obtained for a pyramid reflector having reflective faces which are not of the same size or shape, so long as the faces have a generally planar reflective surface and are arranged in a pyramidal configuration. The term "pyramid" is understood to encompass an arrangement of planar surfaces which define an apex and a base, the base being a general polygon. The same general results also hold in the case where the source is positioned within the reflector but not on the reflector axis.

A reflector comprised of concave mirrors is quite sensitive to errors in the precision of its curved surfaces and to variations in the polar radiation pattern of its cooperating source (caused, for example, by striae in the lamp envelope and shadowing of the lamp filament by its own coils and internal leads). Curved reflectors are thus generally plagued with "hot" zones in the exposure plane, thereby requiring some diffusion to achieve acceptable uniformity. The pyramidal reflector, employing planar surfaces, when used with a radiation source positioned as taught by the present invention, turns out to be remarkably free of such problems since all points in the exposure plane see the true source from various angles, and non-uniformities in the radiation pattern are averaged out.

Figure 3:
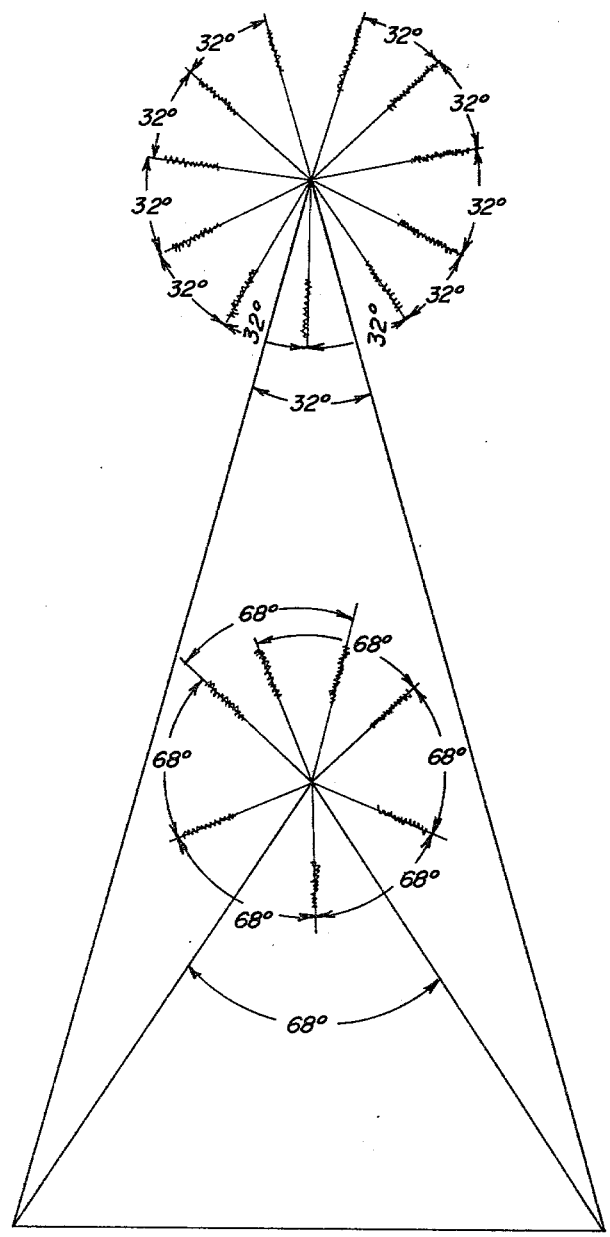
FIG. 3 is an optical diagram showing certain optical properties of reflector arrangements having different apex angles.

Referring to FIG. 3, an optical diagram is shown for two pyramidal reflectors. The optical diagram corresponds to a plane passing through the axis of both reflectors and perpendicular to two opposed reflector faces of such reflectors. One reflector has an apex angle of 32° and the other reflector has an apex angle of 68°. The array of virtual images of each reflector is shown in FIG. 3 and can be obtained by following the ray tracing procedure described in connection with FIG. 2b. As shown in FIG. 3, the images of the true source are equally spaced, starting from the true source, by an angle equal to the reflector apex angle. A short, large-angle reflector (68° apex angle) thus has fewer images of the source than does a tall, small-angle reflector (32° apex angle). The radiation emitted by the true source is thus divided among a multitude of virtual sources, the number being determined by the geometry of the reflector. It is thus apparent that the virtual images closest to the real source undergo one reflection, the next closest images undergo two reflections, and so on around the virtual image array. There is a loss of light at each reflection, partly due to absorption and partly due to scattering at the reflector surface. Thus, the succeeding virtual images appear dimmer as they proceed from the front to the back of the image array (relative to the pyramid base). A large-angle reflector whose reflected virtual images undergo at most three or four reflections is thus more efficient than a tall, small-angle reflector whose light rays undergo perhaps twice as many reflections on the average.

Figure 4B:
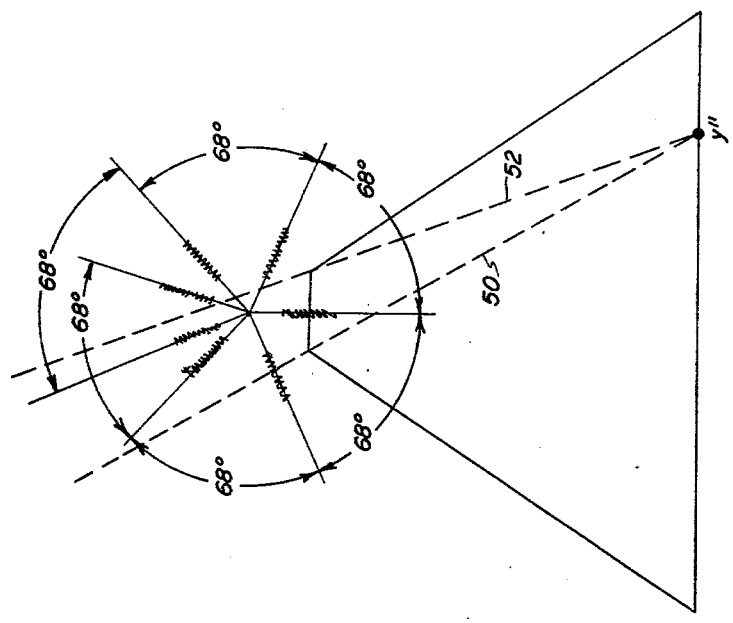
FIGS. 4a and 4b are optical diagrams which illustrate certain optical characteristics of a reflector-light source arrangement in accordance with the present invention.
Figure 4A:
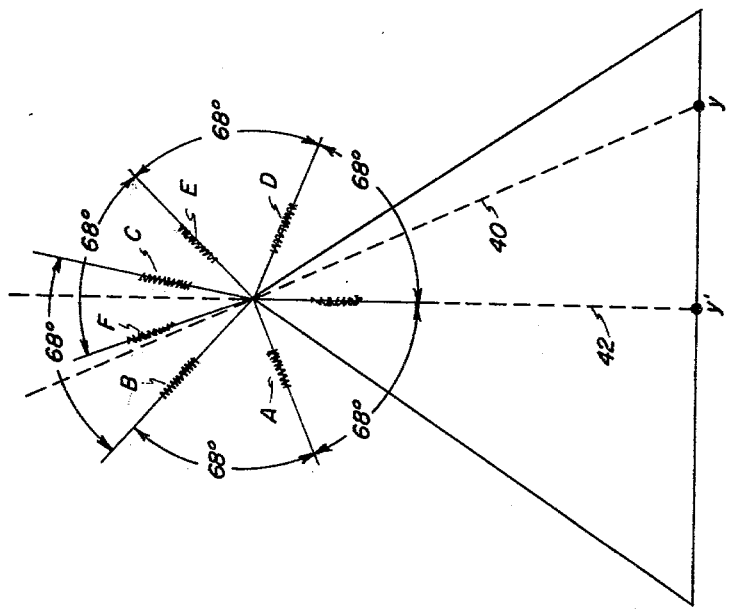

It should be noted that not all virtual images are seen from all view points. The general rule is that a line through the reflector apex and the viewing position defines the limit of the two sides of the circular array. Referring to FIG. 4a, the optical diagram of FIG. 3 is shown for the pyramidal reflector having a 68° apex angle. From a viewpoint y, a line 40 is drawn through the apex of the reflector. Proceeding clockwise from the true source, only two virtual images A, B are seen from the viewpoint y. The next virtual image C lies past the line 40 and is thus not seen from viewpoint y. In a counterclockwise direction from the true source, three virtual images D, E, F are seen from viewpoint y. From a viewpoint y', all of the virtual images seen from the viewpoint y are seen, except for virtual image F, which lies past the line 42 drawn from viewpoint y' through the apex. A similar rule applies to the case of a truncated pyramidal reflector as shown in FIG. 4b, except that to determine the number of virtual images two lines are drawn from the viewpoint. The two lines 50, 52 extend from a viewpoint y" to the truncated edges of the reflector. The line 50 defines the limit of virtual images in a clockwise direction from the true source, while the line 52 defines the limit of virtual images in a counterclockwise direction.

It has been found that for purposes of video disc replication, a sufficient number of virtual images are formed (in a spherical array) when the apex angle is less than about 70°. Apex angles larger than about 70° produce fewer virtual images thereby resulting in illumination of less desirable quality.

As stated, the present invention provides a pyramidal reflector which, when used with a properly positioned radiation source, can be used to illuminate a master video disc for purposes of making contact print replicates. Certain types of master video discs have a reflective surface. For example, one form of master disc comprises a substrate (such as glass) which is coated with a thin layer of metal (such as bismuth), video information being recorded (by prior laser machining, for example), directly in the metal layer, as a distribution of micron-sized apertures. When contact printing such a reflective master disc using the pyramidal reflector arrangement described above, the reflective surface of the master disc may cause a decrease in the specular quality of the illumination. In particular, light which illuminates the exposure plane is reflected from the reflective surface of the master disc back into the pyramidal reflector. This reflected light undergoes multiple reflections in the reflector and is ultimately returned to the master disc. The specular quality of the illumination is decreased because the light which strikes the reflective surface of the master disc for the second time does not come from the apparent source (the true source plus the spherical array of virtual images) but, rather, strikes the master disc surface from various angles. This more diffuse type of illumination lowers the resolution of the contact printing process, thereby reducing the quality of the replicated video data bits.

Figure 5:
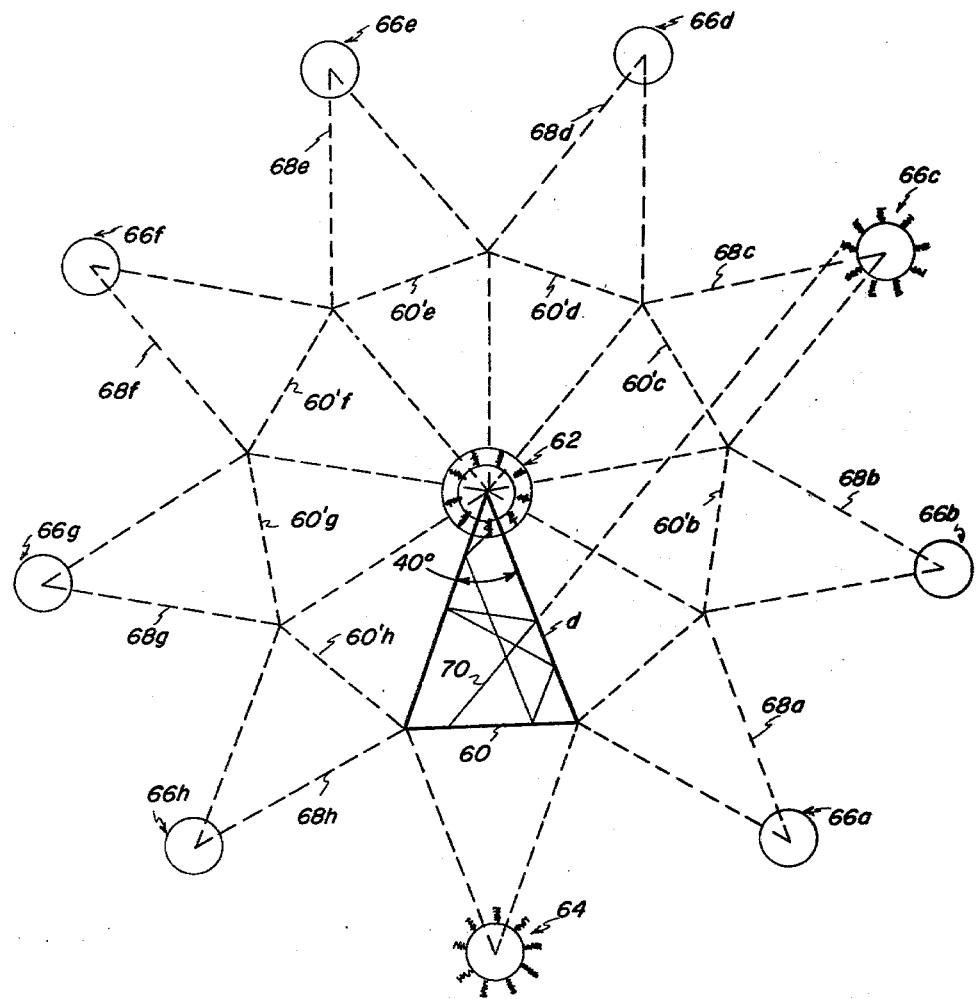
FIG. 5 is an optical diagram which illustrates a problem which occurs when the reflector-light source arrangement of the present invention is used to illuminate a reflective surface.

FIG. 5 is an optical diagram which shows, in heavy solid lines, a pyramidal reflector having a 40° apex angle with a light source near the apex. (The optical diagram corresponds to a plane passing through the axis of the reflector and perpendicular to two opposed faces c, d of the reflector.) As discussed in connection with FIG. 2b, multiple reflections from the faces of the reflector cause the source to appear, from an exposure plane defined by the base of the pyramid, as if it were an array of sources 62 centered about the reflector apex. A reflective surface 60 at the exposure plane causes a portion of the illumination to be reflected back into the reflector as if it were coming from another spherical array of sources 64 below the exposure plane, i.e., from a virtual image 64 of the virtual source 62.

The rays returned to the reflector undergo multiple reflections and eventually return to the exposure plane as if they were coming from a second spherical source array, e.g., sources 66a–h, centered about the apex at a distance of twice the reflector height. (As discussed below, the exposure plane will not, in general, see all of the sources 66a–h.) The positions of these additional virtual sources 66a–h may be found, as before, by "unfolding" the real reflector; see FIG. 5. As seen from FIG. 5, the effect of the reflective surface 60 is to produce an array of "mirror image" reflector-source combinations, each reflector-source combination comprising a reflector 68a–h and a respective virtual source 66a–h. Each of the "mirror image" reflector-source combinations may radiate through its base to illuminate the reflective surface 60. Note that it is possible to draw lines which do not pass through a respective virtual reflector base 60'a–h from some of the virtual sources 66a–h to the true exposure plane (i.e., reflective surface 60). Such lines do not represent possible light paths. The light from each virtual source 66a–h must radiate into its own virtual reflector and leave through its respective base 60'a–h. Thus, virtual sources 66a, 66b, 66h and 66g are not seen from the exposure plane since no line can be drawn from them, through the base of their virtual reflectors, to fall on the real exposure plane. (Note, however, that if the virtual source arrays 66b and 66g were slightly larger, as would occur, for example, if the real source were placed farther from the reflector apex, then parts of these virtual sources could illuminate the outer zone of the exposure plane.) Virtual sources 66c-f will, as shown in FIG. 5, illuminate the exposure plane at angles beyond the illumination half-angle of the primary source array 62 and thus degrade the specularity of the system. As an example, a ray path 70 is shown to indicate the reflections which occur to form a virtual image in the virtual source 66c. Because the intensity of illumination coming from the virtual sources 66c-f depends upon the reflectance of the reflector surfaces, the decrease in specularity will be greater for highly reflective surfaces.

Figure 6:
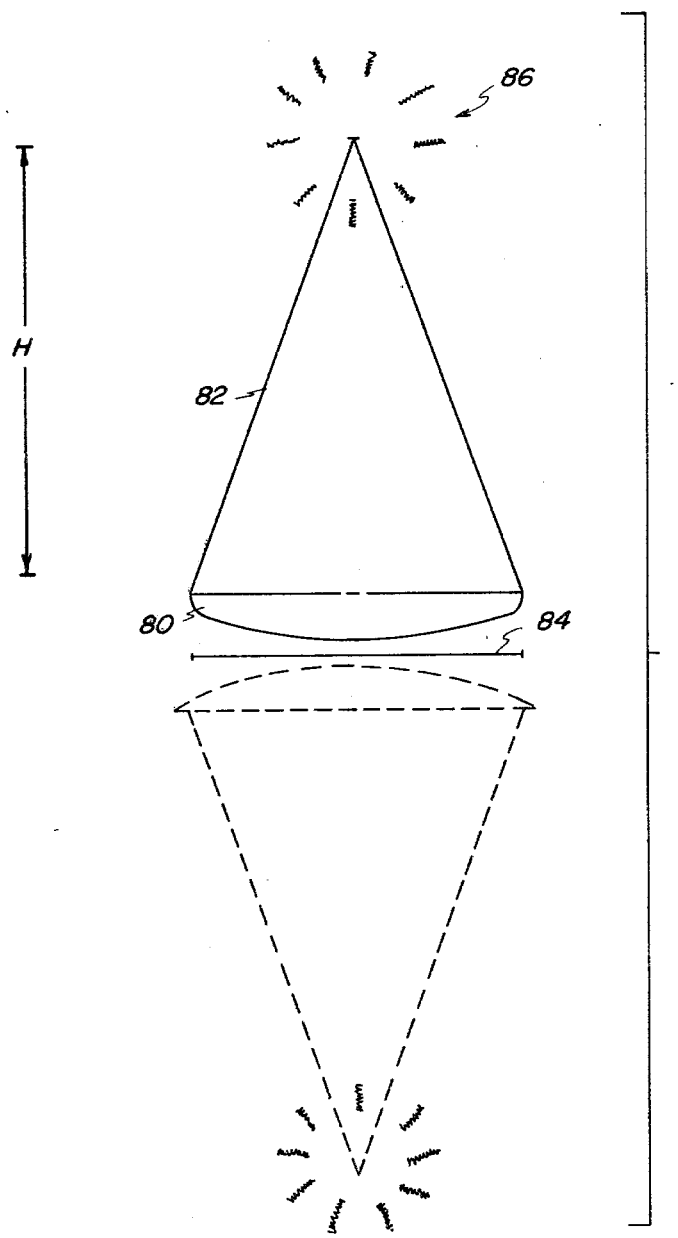
FIG. 6 is a diagram that illustrates an embodiment of the present invention which provides a solution to the problem illustrated in FIG. 5.
Figure 6:
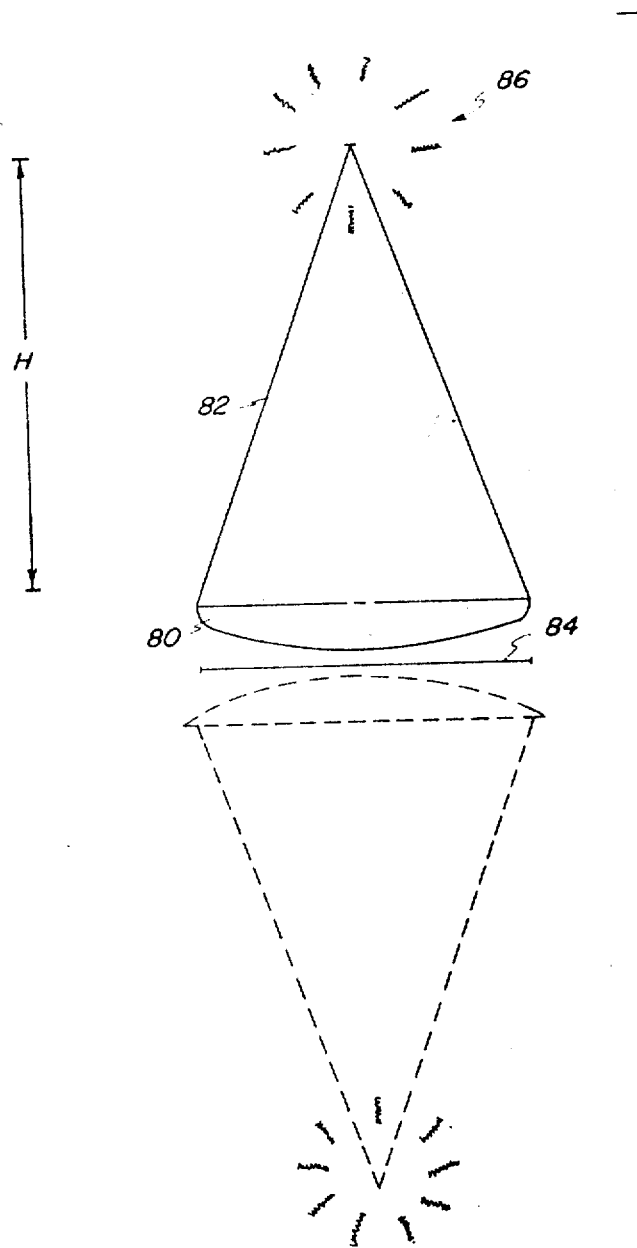

As a solution to this problem, the present invention provides an optical lens disposed in the optical path between the apparent source array 62 and the exposure plane contemplated in FIG. 5 as being at the open base of the reflector). In accordance with the present invention, the lens has a focal length approximately equal to the distance from the apex defined by the reflector to the lens. As a particular example, an optical lens 80 is positioned within a pyramidal reflector 82; see FIG. 6. The lens 80, which may be a condenser lens, fresnel lens, or other optical lens, extends over the entire reflective surface 84 of a reflective master disc placed in an exposure plane below the pyramid base. In accordance with the present invention the focal length of the lens 80 is chosen approximately equal to the apex-to-lens distance, which distance is approximately equal to the height H of the reflector 82. Such a choice for the focal length results in an optical system which focuses the apparent source 86 back into itself. Some reflected rays will be absorbed by the source and serve to increase its temperature. The remainder will either miss the source 86 or be reflected from it. In either case, many of these rays will add to the illumination which appears to come from the primary spherical array 86 of the virtual sources. Rays which miss the true source 86 have the effect of adding a halo around the individual virtual images and will not significantly decrease the specularity of the system.

Since the lens will be working at a relatively large aperture (i.e., about f/2) spherical aberration may be a problem, in which case it may be desirable to use an aspheric lens. A fresnel lens may also be used to achieve a considerable reduction in weight, although practical tests have shown that the wide-angle scatter from the facets of the fresnel lens have a degrading effect upon specularity. Thus, the fresnel lens is probably more useful for those applications wherein the exposure plane and/or reflector facets are highly reflective, the reduction of wide-angle illumination being more significant in these instances relative to the scattering from the facets of the fresnel lens. As an example, for an eight-sided pyramidal reflector constructed of aluminum (for example, ALZAK aluminum available from Alcoa) having a base-to-apex distance of 17.5 inches, it was found for a particular source position that a non-reflective exposure plane had 75% of the radiation received by the midpoint of the exposure plane contained within a 10° half-angle. A reflective master disc placed at the pyramid base so diffused the illumination that only about 52% of the radiation received by the midpoint of the exposure plane was contained within the 10° half-angle. In contrast, adding a fresnel lens at the base of the pyramidal reflector resulted in about 63% of the radiation received by the midpoint of the exposure plane being contained within the 10° half-angle.

While the lens 80 can be positioned anywhere in the optical path between the source of radiation and the exposure plane (as long as the focal length approximately equals the apex-to-lens distance), there are two locations of the lens 80 which are of particular advantage. In the first case the lens is positioned proximate the open base of the pyramidal reflector, this being the position shown in FIG. 6. In this position, the entire reflector is used, thereby providing maximum efficiency. (This would not be the case, for example, if the lens were positioned within the reflector.) In the second case, the lens is positioned proximate the exposure plane (not shown). In this position, the area of even illumination is a maximum.

Throughout the above discussion the exposure plane has been illustrated as being proximate to the open base of the pyramidal reflector. It is convenient to place the exposure plane at this position because little or no radiation escapes from between the open base of the pyramidal reflector and the illuminated object. In applications where this consideration is not important, however, the exposure plane can lie either below or above the open base of the pyramidal reflector. Bringing the exposure plane up into the pyramidal reflector is equivalent to using a smaller (i.e., shorter) reflector of the same apex angle. The illumination produced by lowering the exposure plane below the pyramidal reflector is equivalent to that produced by the apparent source (the true source plus the spherical array of virtual images) radiating through an aperture defined by the open base of the pyramidal reflector. Language used throughout the specification and the accompanying claims to the effect that the base of the pyramidal reflector defines an exposure plane is understood to include the cases where an exposure plane is above or below the open base.

The invention has been described in detail with particular reference to preferred embodiments thereof, but it will be understood that variations and modifications can be effected within the spirit and scope of the invention.

What is claimed is:

1. Contact printing exposure apparatus for use in making a contact print exposure of a replicate device through a master device in contact therewith, said apparatus comprising:
   (a) a reflector comprised of at least three reflective elements each of which elements has a generally planar reflective surface, said reflective elements disposed to form a pyramidal configuration of reflective surfaces, said pyramidal configuration defining an apex having an angle less than about 70°, and said reflector having a transparent base defining an exposure plane at which contacted master and replicate devices are positioned for a contact print exposure;
   (b) a source of radiation positioned within said pyramidal configuration of reflective surfaces so that said exposure plane and thus said contacted master and replicate devices are illuminated by said source of radiation plus a spherical array of virtual images subtending a half-angle less than about 10° as viewed from any point in the exposure plane; and
   (c) an optical lens disposed in the optical path between said source of radiation and said exposure plane, said lens having a focal length approximately equal to the distance between said apex and said lens.

2. Apparatus as claimed in claim 1 wherein said optical lens is a fresnel lens.

3. Apparatus for use in illuminating a reflective master device disposed at an exposure plane, said apparatus comprising:
(a) a reflector comprised of a pyramidal arrangement of generally planar reflective surfaces, said pyramidal arrangement of generally planar reflective surfaces defining an apex and having a transparent base, which base defines an exposure plane;
(b) a source of radiation disposed within said pyramidal arrangement of reflective surfaces so that said exposure plane is illuminated by an apparent source comprised of said source of radiation plus a spherical array of virtual images of said source; and
(c) an optical lens disposed in the optical path between said source of radiation and said exposure plane, said lens having a focal length approximately equal to the distance from said lens to said apex, to thereby focus, back into said apparent source, radiation reflected from a reflective surface placed at said exposure plane.

4. Apparatus as claimed in claim 3, wherein said optical lens is disposed proximate said base and has a focal length approximately equal to the distance from said apex to said base.

5. Apparatus as claimed in claim 3 wherein said optical lens is disposed proximate said exposure plane and has a focal length approximately equal to the distance between said apex and said exposure plane.

6. Apparatus as claimed in claim 3 wherein the apex angle of said pyramidal arrangement of reflective surfaces is less than about 70°.

7. Apparatus as claimed in claim 6 wherein said source of radiation is positioned near enough to the apex of said pyramidal arrangement of reflective surfaces that the half-angle subtended by said spherical array of virtual images, as viewed from any point in the exposure plane, is less than about 10°.

* * * * *

UNITED STATES PATENT AND TRADEMARK OFFICE
CERTIFICATE OF CORRECTION

PATENT NO. : 4,264,947

DATED : April 28, 1981

INVENTOR(S) : William F. Garbe

It is certified that error appears in the above—identified patent and that said Letters Patent is hereby corrected as shown below:

Delete the Fig. of drawing shown on the title page and substitute the attached Fig.

Signed and Sealed this

Twenty-eighth Day of July 1981

[SEAL]

Attest:

GERALD J. MOSSINGHOFF

Attesting Officer

Commissioner of Patents and Trademarks